(No Model.)
C. W. GLOVER.
CENTERING CHUCK.
No. 312,839. Patented Feb. 24, 1885.
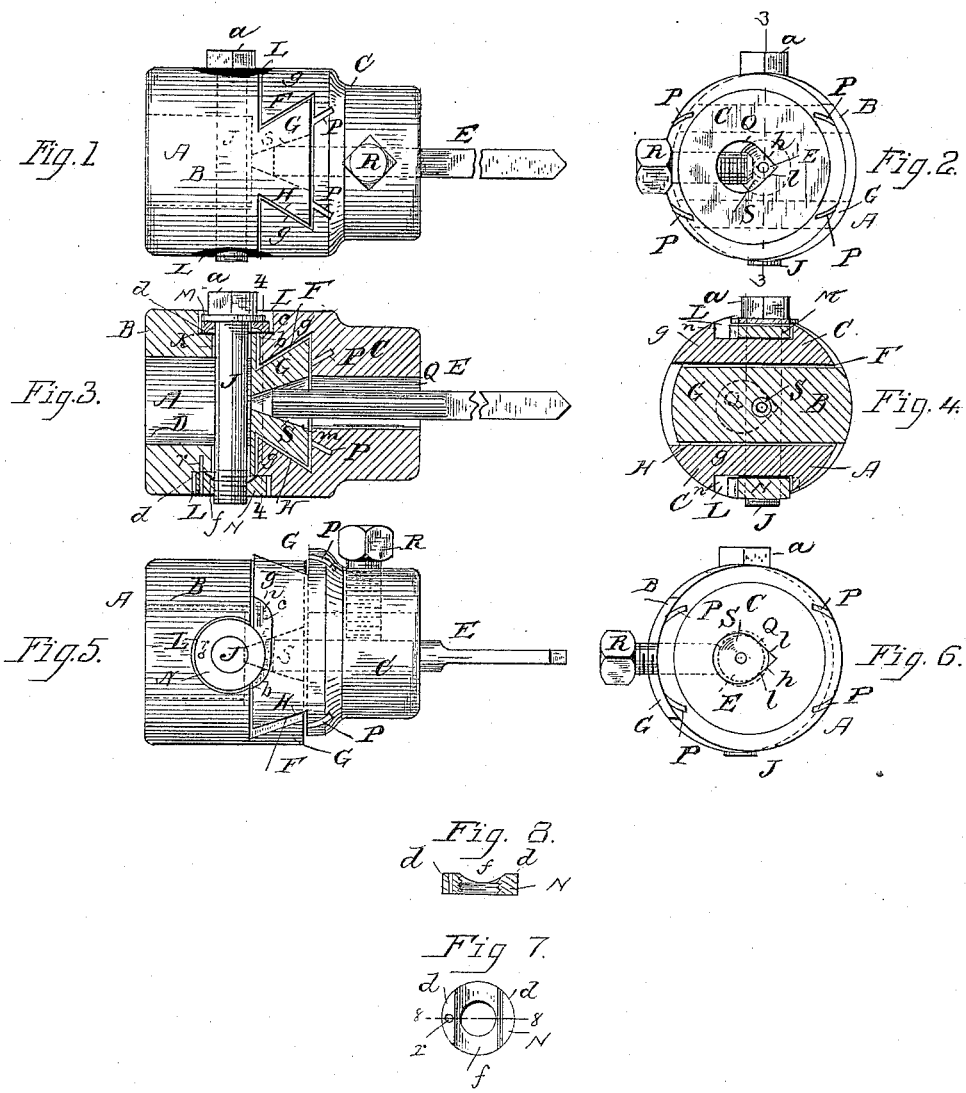
Witnesses—
Carlos W. Glover,
Inventor,
per Brown Bros.
Attorneys.

UNITED STATES PATENT OFFICE.

CARLOS W. GLOVER, OF BOSTON, MASSACHUSETTS.

CENTERING-CHUCK.

SPECIFICATION forming part of Letters Patent No. 312,839, dated February 24, 1885.

Application filed July 7, 1884. (No model.)

*To all whom it may concern:*

Be it known that I, CARLOS W. GLOVER, of Boston, in the county of Suffolk and State of Massachusetts, have invented certain new and useful Improvements in Centering-Chucks, of which the following is a full, clear, and exact description.

This invention relates to improvements in chucks for drills and other tools; and it consists in the construction and arrangement of the parts forming the chuck, all substantially as hereinafter fully described, reference being had to the accompanying plate of drawings, which shows a chuck constructed according to this invention, Figure 1 being a side view; Fig. 2, a front view; Fig. 3, a longitudinal section on line 3 3, Fig. 2; Fig. 5, a side view similar to Fig. 1, but turned around one-quarter way; Fig. 4, a cross-section on line 4 4, Fig. 3; Fig. 6, a front view similar to Fig. 2, to be hereinafter referred to; and Figs. 7 and 8 are detail views.

In the drawings, A represents a chuck made of iron or of any suitable material, substantially in the form of a cylinder, and consisting of two parts, B and C, the part B being adapted by its socket D to be attached to a lathe, &c., and to be secured thereto in any suitable manner, and the part C to receive and hold the drill E or other tool, as will be more particularly described. These two parts B and C are connected together by a dovetail joint, F, at right angles to the central axial line of the chuck, the tongue G being in the part B and the groove H in the part C, the joint being sufficiently free for the part C to slide freely on and across the end of the part B.

J is a screw-bolt having a head, $a$, and arranged to pass loosely through a socket, K, from one side of the part B to the other at right angles to the line of the joint F. At each side of the chuck at the socket K is a recess, L, in which, respectively, are washers M N, through one, M, of which the screw J passes freely and screws into the other, N. The bolt J is sufficiently near to the line of joint for each recess L to extend over and into the part C a little way, as at $c$, so that each washer at one side will extend over the line $b$ of the joint and bear on the part C, and to insure the washer, when the screw-bolt is turned up, bearing on both parts B and C, its under or bearing surface is hollowed out across its width, as shown at $f$, so that when the screw-bolt is screwed up tightly the washers, by their edges $d\ d$, will bear on the parts B and C, and thus both parts be held firmly together. The part C has a slit, P, cut in each side of the inside of the groove H, so that as the screw-bolt J is turned up and the washers M N are forced to their seats on the parts B and C the two portions $g\ g$ of the part C will be forced, from the spring of the metal, firmly upon the tongue G of the part B, and thus insure the two parts B and C being rigidly secured together.

Q is a central longitudinal socket in the part C, and of a diameter large enough to receive the largest drill for which the chuck is adapted. One side, $h$, of said socket is of a V shape in cross-section, its walls $l$ being laterally at equal angles with the central axial line of the chuck and the line of movement of the part C across the part B.

R is a set-screw screwing into the side of the part C, and adapted by its end to bear against the drill E when inserted in the chuck and to hold it firmly against the two sides $l$ of the socket Q.

In the outer end of the part B or the tongue of the joint is a central conical socket, S, its outer end, $m$, being a little larger in diameter than the socket Q in part C, the socket S being in the central axial line of the chuck.

In the use of the chuck the screw R is first turned out sufficiently for the drill E to be inserted in the socket Q, through which it is passed until its end comes to a bearing in the conical socket S, in which it is held by the hand while the screw R is turned to press the drill against the V-shaped bearing, and as it forces and brings the drill to its seat against such bearing the part C of the chuck will be correspondingly moved along its joint F until the drill, &c., is firmly secured against its V-shaped bearing, and with its end closely seated in the conical socket. The drill will then be truly centered in the chuck. The screw J is then screwed up until the part C is firmly secured from movement on the part B. The chuck can then be placed in the lathe, if not already there, and is ready for use.

In Fig. 2 is shown the chuck as having a small drill therein, and in Fig. 6 as having a large drill nearly the diameter of the socket, each shown in dotted lines, and in both cases the drill is in the true center of the chuck, as would also be any drill of any diameter between the two sizes. The recesses on the part C are cut out, as shown at $n$, to allow room for the washers in the movements of the part C across the part B. The washers are held in their places by a cross-pin, $r$, which prevents their turning in their seats when the screw is turned in either direction, thus insuring the constant bearing of the edges $d$ of the washers, respectively, on the parts B and C. A chuck such as described enables the drill to be centered easily, quickly, and truly, and when all secured together is practically a solid chuck, and is strong, durable, and can be made at small expense. The washers are adapted for any form of joint in which a tongue and groove are used, as is obvious. The slits can be cut in any direction desired, or dispensed with entirely, if desired, although it is preferable to have them.

In lieu of the screw J other means of fastening may be employed, although the screw is simple, efficient, and can be arranged at small expense.

Having thus described my invention, what I claim, and desire to secure by Letters Patent, is—

1. A chuck for drills, &c., made in two parts, B and C, one part, B, being adapted to be attached to a lathe, &c., and provided with a central conical socket, and the other part, C, having a V-shaped socket and screw to receive and hold a drill or other tool, and connected together by a dovetail joint and screw, substantially as and for the purpose described.

2. A chuck for drills, &c., made in two parts, B and C, one part, B, being adapted to be attached to a lathe, &c., and the other part, C, to receive and hold a drill, &c., and connected together by a tongue-and-groove joint, a screw, and washers having hollow or concave faces, substantially as and for the purpose specified.

3. In a chuck for drills, &c., made in two parts, B and C, one part, B, being adapted to be attached to a lathe, &c., and having a conical socket, and the other part, C, having a V-shaped central socket, Q, and a screw, R, to receive and hold a drill, &c., said parts B and C being connected together by a tongue-and-groove joint, substantially as and for the purpose specified.

In testimony whereof I have hereunto set my hand in the presence of two subscribing witnesses.

CARLOS W. GLOVER.

Witnesses:
EDWIN W. BROWN,
WM. S. BELLOWS.